US005610963A

United States Patent [19]
Hsieh

[11] Patent Number: 5,610,963
[45] Date of Patent: Mar. 11, 1997

[54] METHODS AND SYSTEMS FOR DETERMINING THE Z-AXIS PROFILE OF A DETECTOR IN A CT SYSTEM

[75] Inventor: Jiang Hsieh, Waukesha, Wis.

[73] Assignee: General Electric Company, Milwaukee, Wis.

[21] Appl. No.: 597,167

[22] Filed: Feb. 6, 1996

[51] Int. Cl.$^6$ .................................................. G21K 5/10
[52] U.S. Cl. ............................. 378/7; 378/151; 378/4
[58] Field of Search ................................... 378/145, 151, 378/147, 150, 4, 7, 12, 16, 19, 62

[56] References Cited

U.S. PATENT DOCUMENTS 4,812,983  3/1989  Gullberg et al. ..................... 364/413.17
5,054,041  10/1991  Hampel ........................................ 378/4
5,131,021  7/1992  Gard et al. ................................. 378/19
5,299,250  3/1994  Stymol et al. .......................... 378/151

*Primary Examiner*—Don Wong
*Attorney, Agent, or Firm*—John S. Beulick; John H. Pilarski

[57] ABSTRACT

Apparatus and methods for generating z-axis profiles for a CT system detector are described. In one form, the method includes the steps of directing x-ray beams having different z-axis centroids and slice thicknesses at the detector and collecting detector signals for each beam. The detector signal for a first beam is then subtracted from the detector signal for a second beam to obtain a differential, or composite, detector signal which corresponds to a third beam having yet another z-axis centroid and slice thickness. The full z-axis profile of the detector is generated from measured detector signals and composite detector signals.

16 Claims, 3 Drawing Sheets

|  | BEAM 1 | BEAM 2 | |
|---|---|---|---|
| SAMPLE NUMBER | APERTURE, ANGLE | APERTURE, ANGLE | CENTROID |
| 1 | 10mm, -3.5° | 7mm, -0.834° | -9.06 mm |
| 2 | 7mm, -3.5° | 5mm, -1.699° | -7.41 mm |
| 3 | 5mm, -3.0° | 3mm, -1.223° | -5.29 mm |
| 4 | 7mm, 1.199° | 5mm, 3.0° | -3.02 mm |
| 5 | 5mm, 1.223° | 3mm, 3.0° | -1.36 mm |
| 6 | 5mm, -1.223° | 3mm, -3.0° | 1.36 mm |
| 7 | 7mm, -1.199° | 5mm, -3.0° | 3.02 mm |
| 8 | 5mm, 3.0° | 3mm, 1.223° | 5.29 mm |
| 9 | 7mm, 3.5° | 5mm, 1.699° | 7.41 mm |
| 10 | 10mm, 3.5° | 7mm, 0.834° | 9.06 mm |

FIG. 5

METHODS AND SYSTEMS FOR DETERMINING THE Z-AXIS PROFILE OF A DETECTOR IN A CT SYSTEM

FIELD OF THE INVENTION

This invention relates generally to computed tomography (CT) imaging and more particularly, to determining the z-axis profile of detectors in CT imaging systems.

BACKGROUND OF THE INVENTION

In at least one known CT system configuration, an x-ray source projects a fan-shaped beam which is collimated to lie within an X-Y plane of a Cartesian coordinate system, generally referred to as the "imaging plane". The x-ray beam passes through the object being imaged, such as a patient. The beam, after being attenuated by the object, impinges upon a detector, which is an array of radiation detector cells. The intensity of the attenuated beam radiation received at the detector cell array is dependent upon the attenuation of the x-ray beam by the object. Each detector cell of the array produces a separate electrical signal that is a measurement of the beam attenuation at the detector location. The attenuation measurements from all the detector cells are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

The CT system x-ray source typically includes an evacuated x-ray envelope containing an anode and a cathode. X-rays are produced when electrons from the cathode are accelerated against a focal spot on the anode by applying a high voltage across the anode and cathode. The x-rays diverge from the focal spot in a generally conical pattern.

In some known CT systems, the x-ray beam from the x-ray source is projected through a pre-patient collimating device, or collimator, that restricts the x-ray beam in the patient axis, or z-axis. More particularly, one known x-ray collimator has a substantially circular cross-sectional shape. A number of apertures extend through the collimator, and each aperture corresponds to a particular slice width. For example, a first aperture corresponds to a 10 mm slice width and a second aperture corresponds to a 7 mm slice width. If a scan is to be performed for a 10 mm slice, then the first aperture is aligned with the expected x-ray focal spot and restricts the beam projected from the focal spot to the 10 mm slice width.

With respect to the CT system detector array, one known array is formed by fifty-four (54) modules. Each module has sixteen (16) cells. A detector cell having a degraded z-axis profile can cause image artifacts that significantly reduce image quality.

To detect z-axis profile cell degradation, detector cell testing is frequently (e.g., every six months) performed at the CT system site. These tests are very tedious and operator intensive. Particularly, as part of such tests, field engineers acquire several sets of scans with flat and sloped phantoms, and images are reconstructed using such scans. The reconstructed images are then subjected to center spot and band artifact analysis. The analysis results are used to identify degraded detector cells that should be replaced.

Another approach, rather than such extensive testing, is to implement an artifact correction algorithm for removing, or at least reducing the effects of, detector cell z-axis profile degradation. Such artifact correction algorithms do not, however, correct the root cause of the problem, i.e., detector cell degradation, and implementation of such a correction algorithm may be very expensive.

It would be desirable, of course, to determine z-axis profile detector cell degradation without requiring tedious and operator intensive testing. It also would be desirable to make such determinations in the field.

SUMMARY OF THE INVENTION

These and other objects may be attained by methods and apparatus which, in one embodiment, determine z-axis profile degradation of detectors implemented in the field. The methods and apparatus are implemented, in one embodiment, in a CT system including a pre-patient collimator. The collimator and each detector cell of the detector array are electrically connected to a computer. The computer is programmed to control the collimator so that x-ray beams, projected from the CT system x-ray source, having different beam centroids impinge upon multiple detector z-axis locations. The detector z-axis profile is determined based on the detector output signals.

More specifically, and in accordance with one embodiment of the present invention, the collimator is controlled by the computer so that data, i.e., detector signals, is collected for a plurality of projected fan beams having differing beam centroids and slice thicknesses. The data collected for the respective projected fan beams is then used to generate composite, or differential, beam detector signals. The differential signal values represent the expected detector signals that would be obtained for beams having selected slice thicknesses and centroids equal to the difference beams. The measured and expected detector signals for the projected and generated x-ray beams, respectively, provide a full characterization of the detector along the detector z-axis.

The above described methods and apparatus enable quick and easy zaxis profile degradation determinations without requiring tedious and operator intensive testing. In addition, such determinations may be made in the field so that any installed but degrading detector can be readily identified and replaced.

BRIEF DESCRIPTION OF THE DRAWINGS

FIG. 5 is a table of sampling pairs and resulting beam centroids.

DETAILED DESCRIPTION OF THE DRAWINGS

Figure 1:
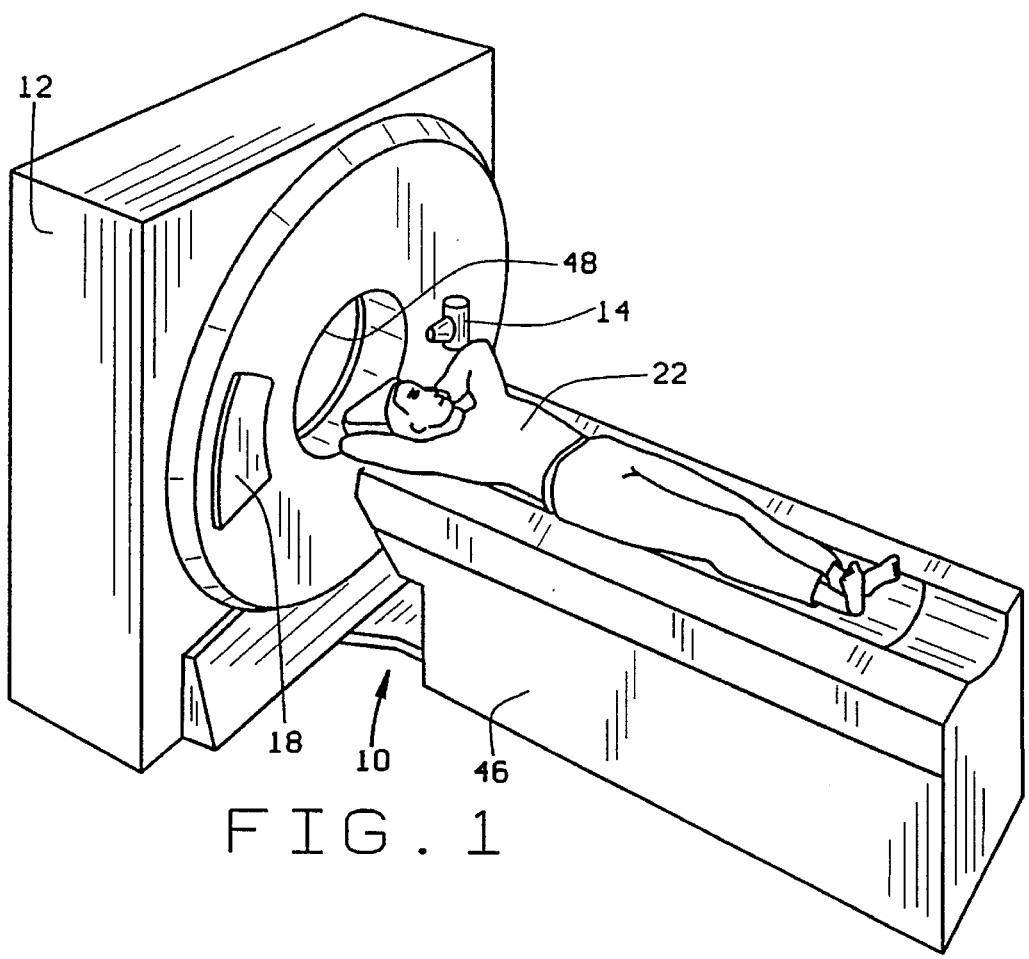
FIG. 1 is a pictorial illustration of a CT imaging system.
Figure 2:
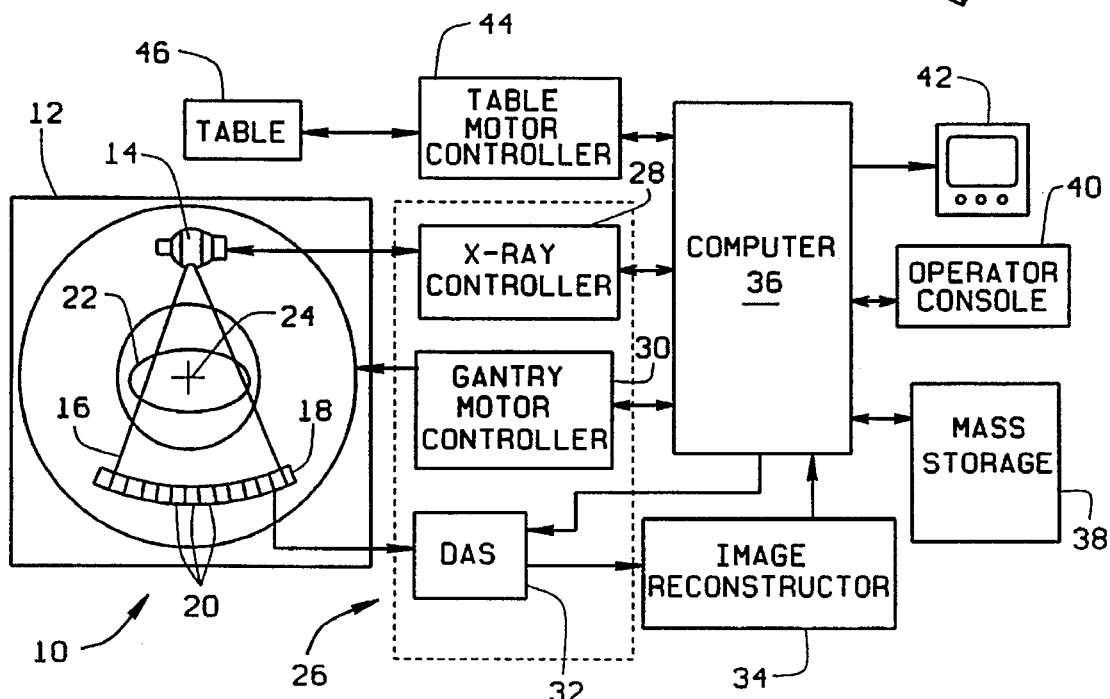
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector 18 is formed by modules of detector elements 20, also referred to herein as detector cells, which together sense the projected x-rays that pass through a medical patient 22. As an example, detector 18 may include fifty-four (54) modules with each module having sixteen (16) cells 20. Each detector cell 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector cells 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38. Preferably, the reconstructed image is stored as a data array.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figures 3A, 3B, 3C:
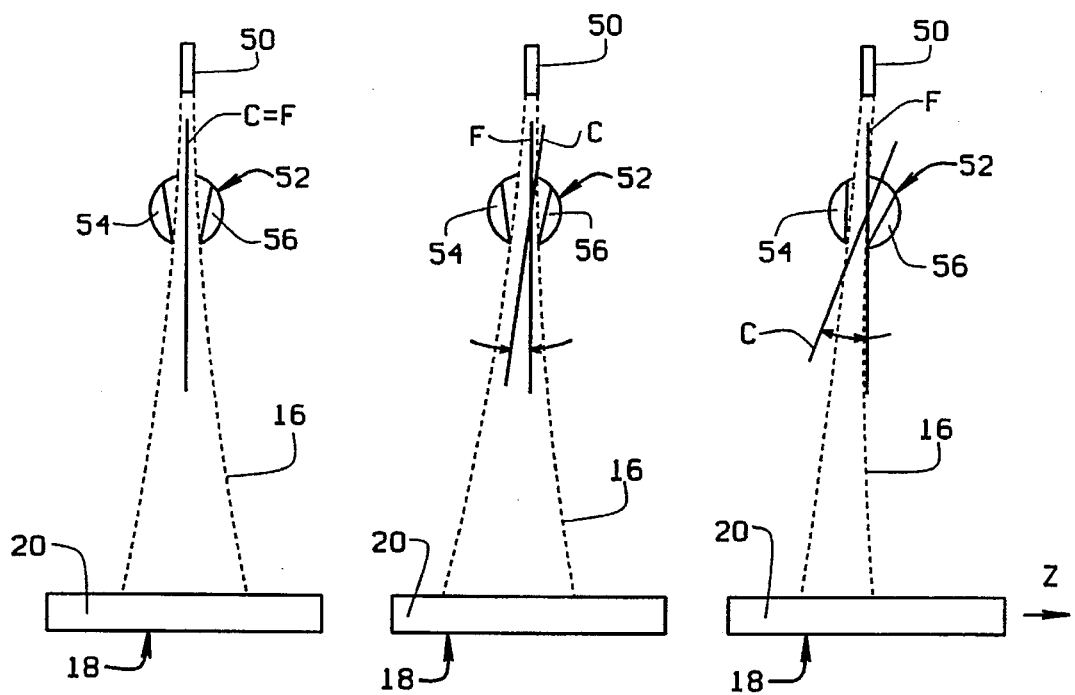
FIGS. 3A, 3B and 3C are schematic illustrations of a beam focal spot, collimator and detector under varying conditions.

Referring to FIG. 3A, x-ray beam 16 emanates from a focal spot 50 of source 14 (not shown in FIG. 3A). X-ray beam 16 is collimated by a pre-patient collimator 52 and is projected toward detector cell 20 of detector array 18. Collimator 52 has a substantially circular cross-sectional shape and an aperture 54 extends through collimator 52. A plurality of other collimator apertures (not shown) may also be formed in and extend through collimator 52, and each aperture corresponds to a particular slice width. For example, aperture 54 may correspond to a 10 mm slice width and another aperture may correspond to a 7 mm slice width. If a scan is to be performed for a 10 mm slice, then aperture 54 is aligned with expected x-ray focal spot 50 and restricts beam 16 projected from focal spot 50 to 10 mm.

Collimator 52 is rotatable about its axis, and the angular orientation of collimator 52 relative to focal spot 50 also affects the profile of beam 16 as described below. Collimator 52 is electrically connected to computer 36 (FIG. 2) so that the angular orientation of collimator 52 can be controlled by computer 36. Collimator 52 is well known in the art.

Known rotatable collimators typically are coupled to a stepper motor which rotates the collimator in multiples of about 0.018°. Energization of the stepper motor is controlled by computer 36 (FIG. 2). Also, as used herein, the term collimator angle refers to the angle between the center axis C of collimator 52 and center axis F of focal spot 50.

Adjusting the angular orientation of collimator 52 is illustrated in FIGS. 3A, 3B and 3C. More specifically, in FIG. 3A, center axis C of collimator 52 and center axis F of focal spot 50 are aligned, i.e., the collimator angle is 0°. As a result, the centroid of beam 16 substantially impinges on the z-axis center of detector cell 20.

In FIG. 3B, collimator 52 is rotated so that center axis C of collimator 52 is angularly offset by an angle e from center axis F of focal spot 50. As a result, the centroid of beam 16 is offset from the z-axis center of detector cell 20.

In FIG. 3C, collimator 52 is further rotated so that center axis C of collimator 52 is angularly offset by an angle δ from center axis F of focal spot 50. Angle δ is greater than angle ε.

When the collimator angle is small, e.g. angle ε, the x-ray beam profile remains substantially constant. That is, the entire x-ray beam 16, including its centroid, shifts along the detector z-axis and away from the nominal position. However, as the collimator angle increases to, for example, angle δ, x-ray beam 16 is clipped, or restricted, by collimator 52. As a result, at angle δ, the profile of x-ray beam 16 begins to change, and the centroid of clipped x-ray beam 16 begins to move back toward the nominal beam position as collimator 52 is further rotated.

In a known CT system, the x-ray beam z-axis profile is relatively constant for collimator angles up to 3 degrees. Generally, the rotation angle permissible before "clipping" increases with the collimator aperture size. For example, for a collimator aperture of 7 mm, i.e., a 7 mm slice thickness, collimator 52 may rotate as much as 3.5 degrees before the x-ray beam z-axis profile is clipped. For a smaller slice thickness, less rotation is permissible before the x-ray beam profile is clipped.

In addition, the shift of the x-ray beam centroid along the detector z-axis is generally proportional to the collimator angle. For example, in at least one known CT system, a 1° collimator angle may produce a 0.93 mm shift in the x-ray beam centroid. Therefore, if x-ray beam clipping is initiated at a collimator angle of 3°, x-ray beam 16 can be shifted from its nominal position approximately 3 mm in either z-axis direction on detector cell 20 for a total of 6 mm z-axis movement.

Therefore, by simply rotating the collimator within the non-clipping range, e.g., 3° to −3°, the center z-axis 6 mm of detector cell 20 can be characterized. To fully characterize detector cell 20, however, the center z-axis 20 mm typically must be characterized. Obtaining the z-axis detector cell profile for the center 20 mm is necessary if, for example, the maximum slice thickness is 10 mm, which corresponds to the center z-axis 17.4 mm of detector cell 20. If additional z-axis movement of focal spot 50 due to thermal and gravitational force also is considered, then about the center z-axis 20 mm of cell 20 should be characterized. Collimator rotation, however, only enables characterizing the center z-axis 6 mm.

In accordance with one embodiment of the present invention, and to fully characterize detector cell 20, collimator 52 is controlled by computer 36 so that data, i.e., detector signals, is collected for a plurality of fan beams having differing beam centroids and slice thicknesses. The data is then used to generate composite, or differential, beam detector signals. The differential signal values represent the expected detector signals that would be generated for beams having selected slice thicknesses and centroids at selected z-axis locations different from the projected x-ray beams. The measured detector signals and the generated detector signals provide a full characterization of the detector along the detector z-axis.

Figures 4A, 4B:
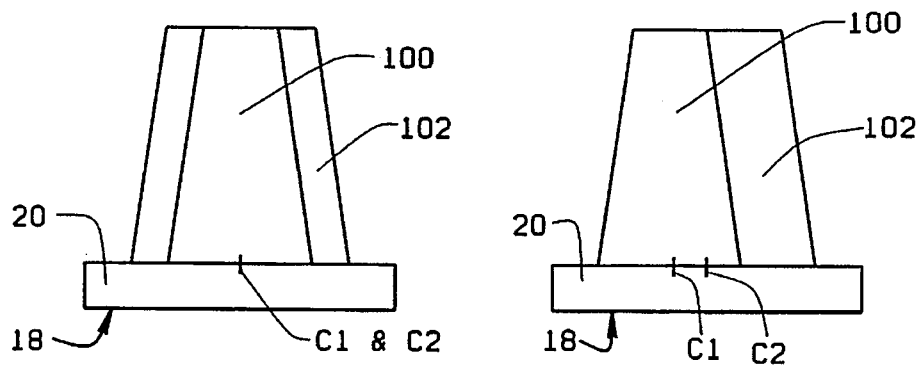
FIGS. 4A, 4B and 4C are schematic illustrations of x-ray beams impinging upon a detector.

For example, FIG. 4A illustrates a first x-ray beam 100 having a first centroid C1 and a 3 mm slice thickness and a second x-ray beam 102 having a second centroid C2 and a 5 mm slice thickness. Beam 100 is superimposed over beam 102 in their nominal positions, i.e., the collimator angle is 0°, for illustration purposes only. Each beam 100 and 102 would, of course, be separately generated.

Referring to FIG. 4B, first beam profile 100 is now shifted by rotating collimator 52 so that beam 100 is substantially aligned with the left-most region of second beam 102. That is, beam 100 is shifted so that the left-most edge of beam 100 is substantially aligned with the left-most edge of beam 102, and first centroid C1 is offset from second centroid C2. Shifting beam 100 is accomplished by rotating collimator 52 as described above.

Figure 4C:
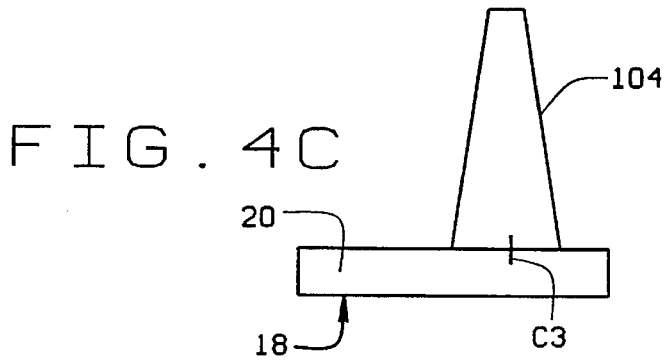

FIG. 4C illustrates the composite x-ray beam 104 which corresponds to the differential, or composite, x-ray beam obtained by subtracting beam 100 from beam 102. Composite beam 104 has a centroid C3 which, as compared to centroids C1 and C2 of beams 100 and 102 as shown in FIG. 4B, is shifted to the right. Beam 104 also has a smaller slice thickness as compared to beams 100 and 102. The detector signals for composite beam 104 are obtained by subtracting the detector signals for beam 100 from the detector signals for beam 102.

Several combinations of fan beam slice thicknesses and collimator angles are used to obtain composite beam detector signals along the detector z-axis. By properly selecting such parameters, the z-axis profile of detector cell 18 can be fully characterized.

For example, as shown in FIG. 5, and in accordance with one embodiment, ten (10) samples which correspond to respective composite beams are sufficient to fully characterize the center 18 mm of a detector. Each sample number corresponds to a respective composite beam having the indicated centroid. The composite beam data is obtained by subtracting the detector cell data obtained for a beam generated with the collimator having an apex lure width and a collimator angle as specified for BEAM 2 from the detector cell data obtained for a beam generated with the collimator having an aperture width and collimator angle as specified for BEAM 1.

To decrease the effects of any slight misalignment, the composite signals may be normalized. Particularly, the inner, or center, cells of a detector module deteriorate less often than the edge cells. The "edge" cells may, for example, be the three outermost cells on each end of the detector array. All the other cells of the detector module, e.g., the center ten (10) cells, may be the "center" cells. The center cells of the detector module therefore may be used for difference signal normalization. For example, the signals output by the center cells may be used to determine a set of scaling factors which, when applied to the center cell output signals under normalization conditions, provide "flat" reference signals.

In addition, some regions on a detector cell can be characterized by different sample combinations, e.g., one region of the cell can be covered by the 3 mm and 5 mm slice thickness beams or the 5 mm and 7 mm slice thickness beams. The duplicate measurements or samples obtained for one region can also be used for signal normalization since duplicate measurements should be equal.

Computer 36 (FIG. 2), in one implementation, is programmed to perform the steps of adjusting the collimator aperture and collimator angle, enabling the x-ray source to project a x-ray beam, and sampling the detector cells of the detector array to obtain the required beam data, i.e., detector signals, for multiple beams. Computer 36 also is programmed to perform the step of subtracting beam data for a first beam from the beam data for a second beam, to obtain composite beam data. The number of differential, or composite, beams generated depends, for example, on the maximum slice thickness used in the CT system. The detector z-axis profile can be fully characterized from the detector signals and composite beam data.

After determining the detector z-axis profile, and in accordance with one embodiment, a sloped to flat phantom ratio may be generated without performing any additional scans to determine detector degradation. Computer 36 (FIG. 2) can be programmed to generate the sloped to phantom ratio, for example, by weighting the detector z-axis profiles using a normalized ramp function. Computer 36 may also be programmed to identify, as a degraded cell, any detector cell having a significant deviation in the ratio from an ideal value of one.

It should be understood that although the term "detector" degradation is used above in reference to the entire detector array, the methods and apparatus described herein can be used to determine not only detector array degradation but also detector cell degradation. That is, degradation of both the detector array as a whole and an individual detector cell can be determined using the above described methods and apparatus.

Computer 36 can also be programmed to generate z-axis calibration vectors, sometimes referred to as Q-CAL vectors, for the detector. A Q-CAL vector is typically obtained by performing air scans when the x-ray tube is warm and when the x-ray tube is hot. Since the x-ray focal spot moves due to target thermal expansion, the air scans taken at different tube temperatures correspond to different z-axis detector locations.

Since an x-ray beam can be more easily shifted along the z-axis using collimator rotation as described above, such collimator rotation is a more time efficient manner to generate Q-CAL vectors than known methods. In addition, because the position of the x-ray beam on the detector can be controlled by collimator rotation, the detector may be sampled more finely to generate information for higher order correction.

Moreover, computer 36 can be programmed to perform detector z-axis degradation monitoring. As described above, a new Q-CAL vector may be generated as often as desired. By comparing successive Q-CAL vectors, computer 36 can determine the quality of the detector. For example, if the difference between successive vectors becomes significant, i.e., in the detector response changes, the old Q-cal vector can be replaced by the new Q-CAL vector. A large rate of change between successive vectors indicates that the detector deterioration process is accelerated and the detector should be replaced before it reaches the failure stage.

Further, collimator 52 can have many configuration other than the configuration illustrated in FIGS. 3A, 3B and 3C. For example, another known collimator that can be used has two opposing spaced metallic blades. An aperture is formed between, and defined by the edges of, the blades. In operation, an x-ray beam is projected through the collimator aperture from the x-ray source. The blades are adjustable so that the aperture dimensions, e.g., width, can be adjusted. The blades can also be asynchronously adjusted so that the beam centroid is offset from the z-axis center of the detector cells.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used. Accordingly, the spirit and scope of the invention are to be limited only by the terms of the appended claims.

What is claimed is:

1. A method for determining the z-axis profile of a detector cell in a computed tomography system, the computed tomography system including an x-ray source for projecting an x-ray beam toward the detector cell, and a pre-patient collimator for restricting the x-ray beam, the detector cell configured to generate a detector cell signal representative of the beam characteristics of an x-ray beam impinging thereon, said method comprising the steps of:

acquiring a first detector cell signal from the detector cell when a first x-ray beam having a first centroid impinges thereon;

acquiring a second detector cell signal from the detector cell when a second x-ray beam having a second centroid impinges thereon; and generating a composite detector cell signal from the first and second detector cell signals, the composite detector cell signal representative of a third detector cell signal expected when a third x-ray beam having a third centroid impinges on the detector cell.

2. A method in accordance with claim 1 wherein generating the composite detector cell signal comprises the step of subtracting the first detector cell signal from the second detector cell signal.

3. A method in accordance with claim 1 wherein the first, second and third beam centroids are at different z-axis detector cell locations.

4. A method in accordance with claim 1 wherein the pre-patient collimator is adjustable so that the first x-ray beam is restricted to a first aperture width and the second x-ray beam is restricted to a second aperture width, the first aperture width being different than the second aperture width.

5. A method in accordance with claim 1 wherein the x-ray beam is projected from a focal spot on the x-ray source, the collimator being rotatable relative to the focal spot, and the first x-ray beam is projected at a first collimator angle and the second x-ray beam is projected at a second collimator angle, the first collimator angle being different than the second collimator angle.

6. A method in accordance with claim 7 wherein the first x-ray beam has a first slice width and the second x-ray beam has a second slice width, the first slice width being different than the second slice width.

7. Apparatus for determining the z-axis profile of a detector in a computed tomography system, the computed tomography system including an x-ray source for projecting an x-ray beam toward the detector, and a prepatient collimator for restricting the x-ray beam, the detector configured to generate a detector signal representative of the beam characteristics of an x-ray beam impinging thereon, said apparatus comprising a computer electrically coupled to the x-ray source, the pre-patient collimator, and the detector, said computer programmed to:

acquire a first detector signal from the detector when a first x-ray beam having a first centroid impinges thereon;

acquire a second detector signal from the detector when a second x-ray beam having a second centroid impinges thereon; and generate a composite detector cell signal from the first and second detector signals, the composite detector signal representative of a third detector signal expected when a third x-ray beam having a third centroid impinges on the detector.

8. Apparatus in accordance with claim 7 wherein to generate the composite detector cell signal, said computer is programmed to subtract the first detector cell signal from the second detector cell signal.

9. Apparatus in accordance with claim 7 wherein said computer controls the pre-patient collimator so that the first and second beam centroids are at different z-axis detector locations.

10. Apparatus in accordance with claim 7 wherein the pre-patient collimator is adjustable, and said computer controls the pre-patient collimator so that the first x-ray beam is restricted to a first aperture width and the second x-ray beam is restricted to a second aperture width, the first aperture width being different than the second aperture width.

11. Apparatus in accordance with claim 7 wherein the x-ray beam is projected from a focal spot on the x-ray source, the collimator being rotatable relative to the focal spot, and said computer controls the pre-patient collimator so that the first x-ray beam is projected at a first collimator angle and the second x-ray beam is projected at a second collimator angle, the first collimator angle being different than the second collimator angle.

12. Apparatus in accordance with claim 11 wherein said computer controls the pre-patient collimator so that the first x-ray beam has a first slice width and the second x-ray beam has a second slice width, the first slice width being different than the second slice width.

13. Apparatus in accordance with claim 7 wherein said computer is further programmed to:

generate a sloped to flat phantom ratio; and based on the sloped to flat phantom ratio, determine detector cell degradation.

14. Apparatus in accordance with claim 13 wherein to generate a sloped to flat phantom ratio, said computer is programmed to weight the detector z-axis profiles using a normalized ramp function.

15. Apparatus in accordance with claim 7 wherein said computer is further programmed to generate z-axis calibration vectors based on the detector z-axis profiles.

16. Apparatus in accordance with claim 7 wherein said computer is further programmed to monitor detector z-axis degradation by generating z-axis calibration vectors and comparing successive vectors to determine a rate of change between the successive vectors.

* * * * *